US012739819B2

(12) United States Patent
Yang et al.

(10) Patent No.: US 12,739,819 B2
(45) Date of Patent: Sep. 15, 2026

(54) RESOURCE ALLOCATION FOR PDCCH WITH MULTI-RELAY BASED COMMUNICATION

(71) Applicant: QUALCOMM Incorporated, San Diego, CA (US)

(72) Inventors: Luanxia Yang, Beijing (CN); Jing Sun, San Diego, CA (US); Changlong Xu, Beijing (CN); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 18/280,615

(22) PCT Filed: May 27, 2021

(86) PCT No.: PCT/CN2021/096334
§ 371 (c)(1),
(2) Date: Sep. 6, 2023

(87) PCT Pub. No.: WO2022/246731
PCT Pub. Date: Dec. 1, 2022

(65) Prior Publication Data
US 2024/0147460 A1 May 2, 2024

(51) Int. Cl.
*H04W 72/1263* (2023.01)
*H04W 72/23* (2023.01)

(52) U.S. Cl.
CPC ....... *H04W 72/1263* (2013.01); *H04W 72/23* (2023.01)

(58) Field of Classification Search
None
See application file for complete search history.

(56) References Cited

U.S. PATENT DOCUMENTS

2012/0120868 A1* 5/2012 Park .................... H04B 7/2606 370/315
2012/0140726 A1 6/2012 Moon et al.
2021/0044404 A1* 2/2021 Liu ..................... H04B 7/0697

FOREIGN PATENT DOCUMENTS

CN 112423396 A 2/2021
EP 2410668 A2 1/2012
EP 2584811 A1 4/2013
EP 2584811 B1 * 4/2016 ........... H04W 72/23

OTHER PUBLICATIONS

International Search Report and Written Opinion—PCT/CN2021/096334—ISA/EPO—Dec. 8, 2021.

* cited by examiner

*Primary Examiner* — Kouroush Mohebbi
(74) *Attorney, Agent, or Firm* — Procopio, Cory, Hargreaves & Savitch LLP

(57) ABSTRACT

A configuration for resource allocation for PDCCH with multi-relay based communication. The apparatus determines a transmission time of a signal comprising a sequence of a plurality of PDCCHs to a target node. At least one relay is between the base station and the target node. The apparatus transmits, to each of the at least one relay, a relay configuration comprising scheduling information for each of the at least one relay to relay the signal. The scheduling information is based on a determination of the transmission time of the signal to the target node.

30 Claims, 14 Drawing Sheets

200
One Frame (TDD)
10 ms
subframe
RB
slot
subcarrier
OFDM symbol
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
SRS
SRS Comb 0
SRS Comb 1

280
PUCCH
PUSCH

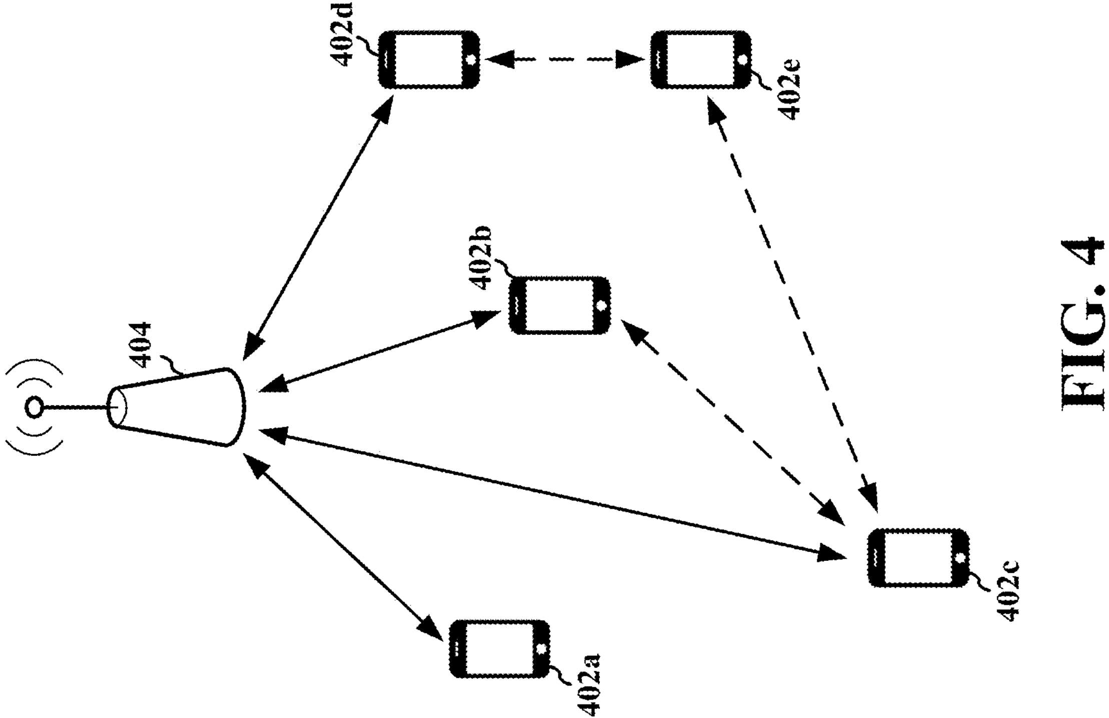
FIG. 4

900

RESOURCE ALLOCATION FOR PDCCH WITH MULTI-RELAY BASED COMMUNICATION

CROSS REFERENCE TO RELATED APPLICATION(S)

This application is a National Stage Application filed under 35 U.S.C. § 371 of PCT International Application No. PCT/CN2021/096334, entitled "RESOURCE ALLOCATION FOR PDCCH WITH MULTI-RELAY BASED COMMUNICATION" and filed May 27, 2021, which is expressly incorporated by reference herein in its entirety.

TECHNICAL FIELD

The present disclosure relates generally to communication systems, and more particularly, to a configuration for resource allocation for physical downlink control channel (PDCCH) with multi-relay based communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus determines a transmission time of a signal comprising a sequence of a plurality of physical downlink control channels (PDCCHs) to a target node. At least one relay is between the base station and the target node. The apparatus transmits, to each of the at least one relay, a relay configuration comprising scheduling information for each of the at least one relay to relay the signal. The scheduling information is based on a determination of the transmission time of the signal to the target node.

In an aspect of the disclosure, a method, a computer-readable medium, and an apparatus are provided. The apparatus may be a device at a relay device. The device may be a processor and/or a modem at a relay device or the relay device itself. The apparatus receives, from a base station, a relay configuration comprising scheduling information to relay a signal from the base station to a target node. At least one relay is between the base station and the target node. The apparatus relays the signal based on the scheduling information of the relay configuration. The signal comprises a sequence of a plurality of physical downlink control channels (PDCCHs).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating an example of a base station and UEs in a wireless communication system.

DETAILED DESCRIPTION

Figure 1:
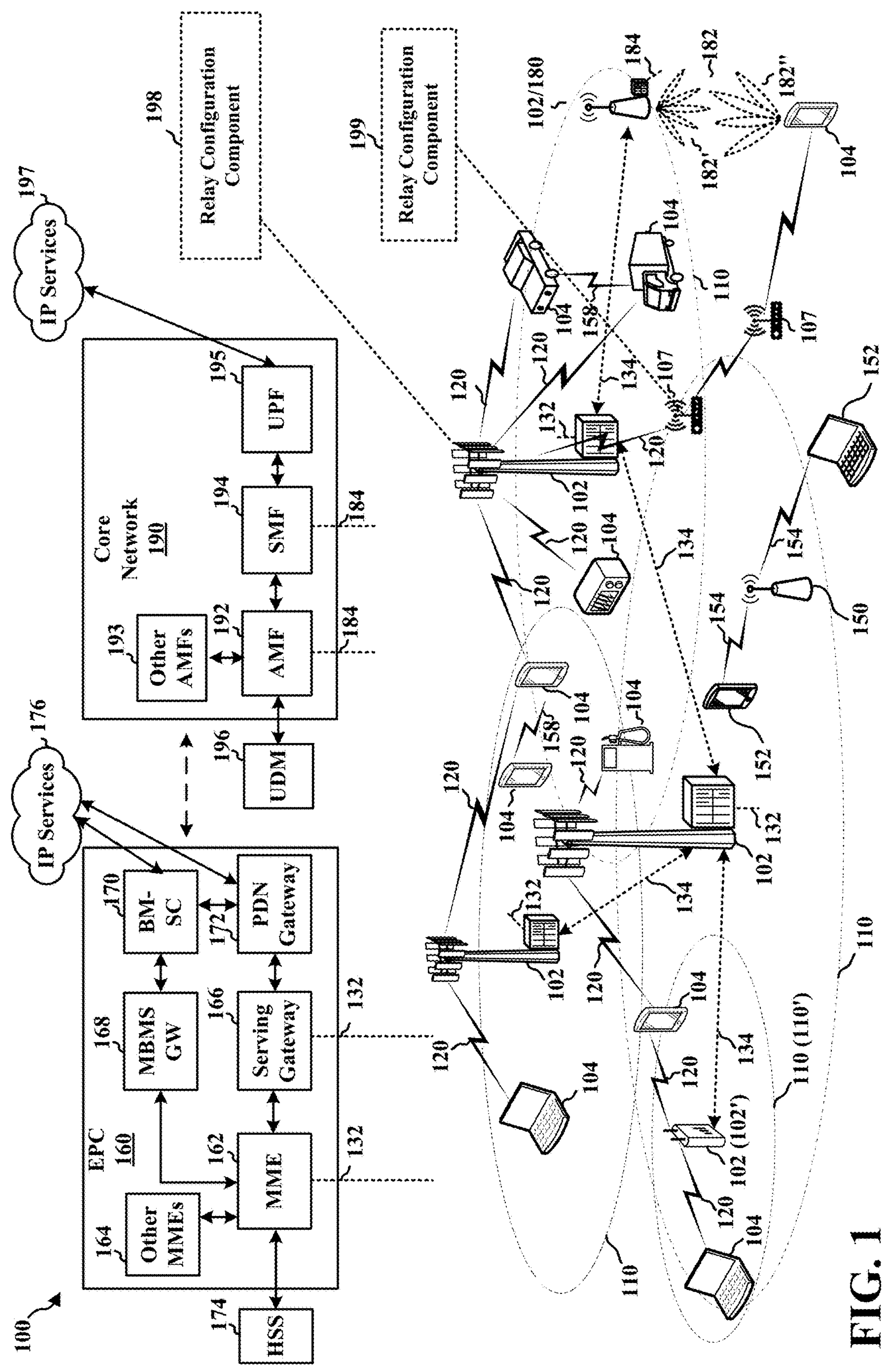
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the relay 107 may be configured to relay a signal based on an allocation of resources and a relay schedule for multi-relay based communication received from a base station. For example, the relay 107 may comprise a relay configuration component 198 configured to relay a signal based on an allocation of resources and a relay schedule for multi-relay based communication received from a base station. The relay 107 may receive, from a base station 180, a relay configuration comprising scheduling information to relay a signal from the base station to a target node. At least one relay is between the base station and the target node. The relay 107 may relay the signal based on the scheduling information of the relay configuration. The signal may comprise a sequence of a plurality of PDCCHs.

Referring again to FIG. 1, in certain aspects, the base station 180 may be configured to provide an allocation of resources and a relay schedule for multi-relay based communication. For example, the base station 180 may comprise a relay configuration component 199 configured to provide an allocation of resources and a relay schedule for multi-relay based communication. The base station 180 may determine a transmission time of a signal comprising a sequence of a plurality of PDCCHs to a target node. At least one relay is between the base station and the target node. The base station 180 may transmit, to each of the at least one relay, a relay configuration comprising scheduling information for each of the at least one relay to relay the signal. The scheduling information may be based on a determination of the transmission time of the signal to the target node.

Although the following description may be focused on 5G NR, the concepts described herein may be applicable to other similar areas, such as LTE, LTE-A, CDMA, GSM, and other wireless technologies.

Figures 2A, 2B, 2C, 2D:
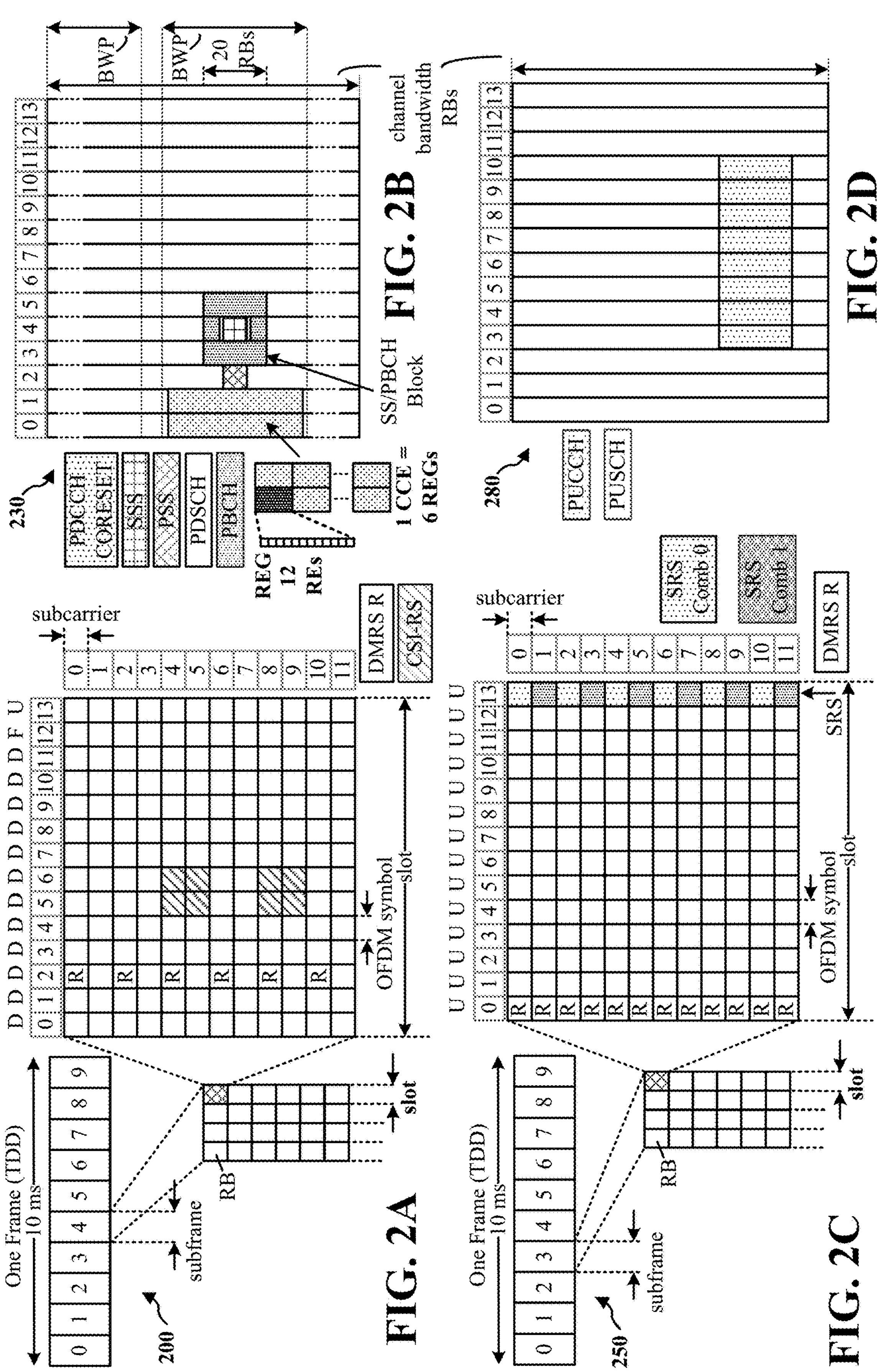
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
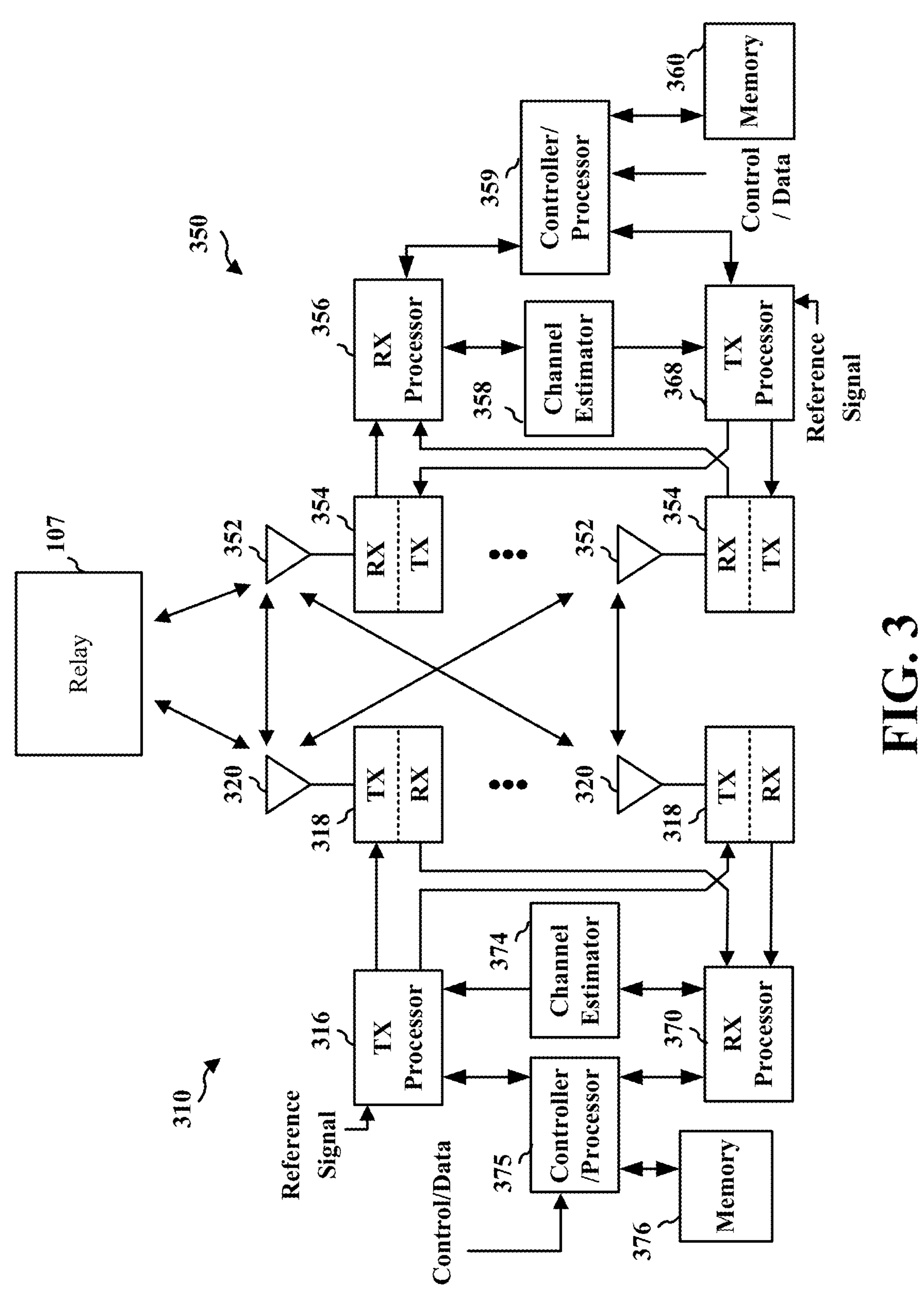
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with relay configuration component 198 or 199 of FIG. 1.

At least one of the TX processor 316, the RX processor 370, and the controller/processor 375 may be configured to perform aspects in connection with relay configuration component 198 or 199 of FIG. 1.

In wireless communication systems, wireless communication between a base station 404 and UEs (e.g., 402*a-e*) may include a direct link between the base station 404 and the UE (e.g., 402*a*, 402*b*, 402*c*, 402*d*). Sidelink communication may comprise direct communication between UEs. With reference to example 400 of FIG. 4, UEs 402*b* and 402*c* may have established a sidelink connection to communicate with each other. In addition, UEs 402*d* and 402*e*, and 402*c* and 402*e* may also have sidelink connections to communicate with each other. As an enhancement, sidelink communication may allow for using a UE as a relay device to assist a UE (e.g., UE 402*c*) to communicate with the base station in instances where the UE (e.g., 402*c*) has limited coverage or is experiencing difficulty in communicating with the base station. The relay UE (e.g., 402*b*) may be in a better position to communicate with the base station, than the UE 402*c*, such that the UE 402*c* may communicate with the base station via the UE 402*b*.

Figure 5:
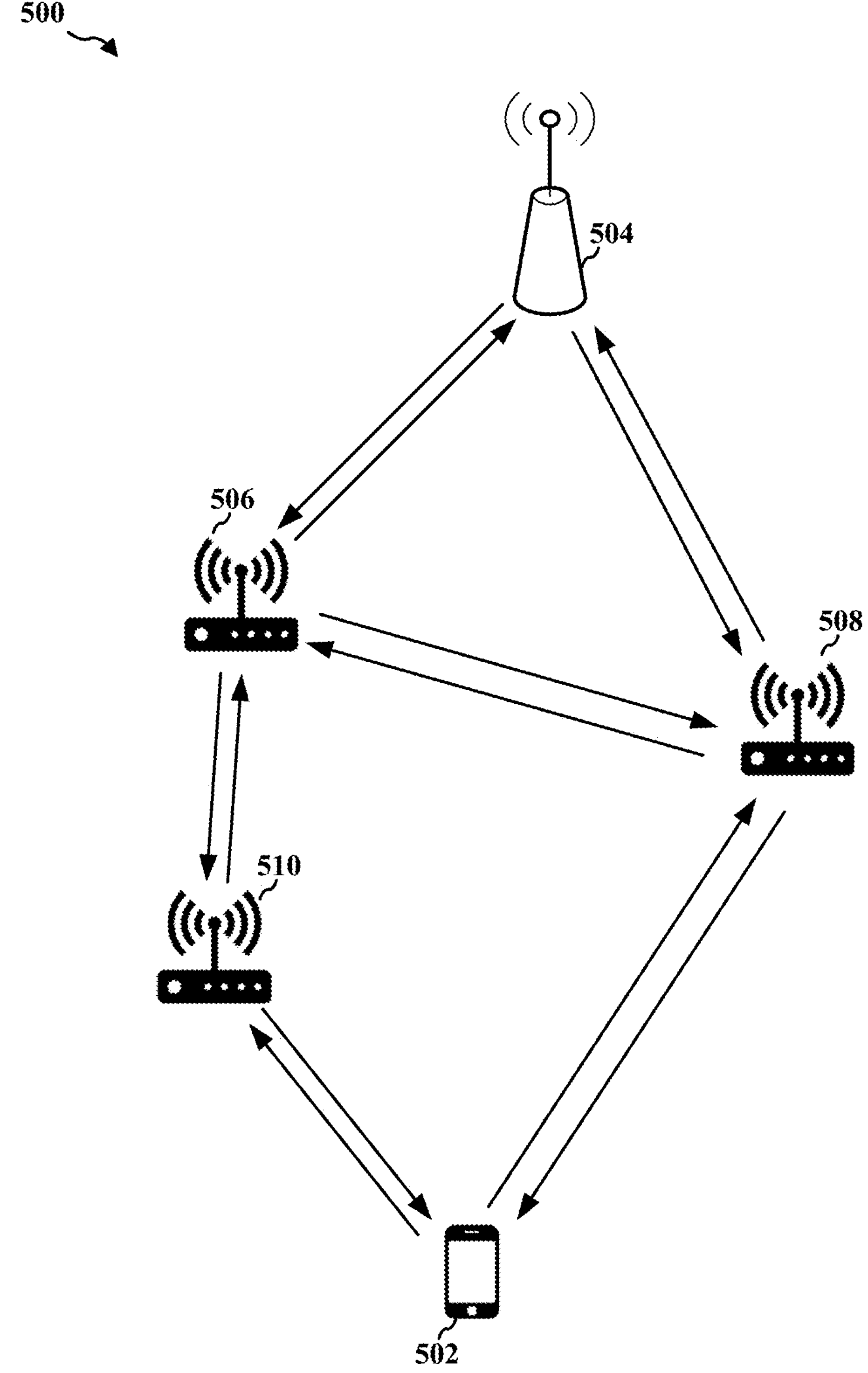
FIG. 5 is a diagram illustrating an example of a multi-relay based communication system.

FIG. 5 provides an example 500 of a multi-relay based communication system. The example 500 of FIG. 5 may comprise a UE 502, a base station 504, and one or more relay devices 506, 508, 510. The UE 502 may communicate with the base station 504 using the one or more relay devices. In some instances, there may be multiple relay links between the UE 502 and the base station 504. For example, in instances where only one relay (e.g., 508) is between the UE 502 and the base station 504, two relay links are present between the UE 502 and the base station 504. A first relay link comprising a link between the UE 502 and the relay 508, and a second relay link comprising a link between the relay 508 and the base station 504. In some instances, three or more relay links may be present between the UE 502 and the base station 504. For example, a first relay link may comprise a link between the UE 502 and the relay 510, a second relay link may comprise a link between the relay 510 and the relay 506, and a third relay link may comprise a link between the relay 506 and the base station 504. The process of signal relay utilizes the physical layer, and does not involve the upper layer or the MAC layer, such that delay may be minimal. In multi-relay communications, the base station controls the transmission and retransmission of each relay and the content to be transmitted. As a result, the base station may be updated with the status of the decoding at each relay. For example, if a transport block is decoded at a relay, the transport block may be forwarded down-stream. If a transport block is not properly decoded at a relay node, the base station may schedule a retransmission of the transport block to the relay. The use of relay devices may be used to increase the coverage of the base station as well as reduce the load of the base station. The base station may schedule the relay transmission and reception in downlink and uplink.

The scheduling of the relay uplink transmission and downlink reception may be straightforward in instances where the base station is directly connected to the relay. However, if the relay is used to assist in the communication of a child node, the base station may use a sequence of PDCCHs along the relay route from the base station to the target node to carry the control information. However, the sequence of PDCCHs do not indicate the allocation of resources for relaying the signal in a multi-relay environment.

Aspects provided herein provide a configuration for resource allocation for relaying a signal in multi-relay based communications. For example, a base station may be configured to provide an allocation of resources and a relay schedule for multi-relay based communication. The base station may provide the allocation of resources and the relay schedule to one or more relay nodes between the base station and the target node. At least one advantage of the disclosure is that a relay device may be configured to relay a signal based on an allocation of resources and a relay schedule for multi-relay based communication received from a base station. In instances where the target node is not directly connected with the base station, the base station may utilize a sequence of PDCCHs along the relay route to carry the control information. The relay configuration may indicate a resource allocation for each of the relay nodes between the base station and the target node to relay the signal. The schedule may indicate a transmission time of the signal, such that each relay between the base station and the target node is scheduled to relay the signal at a specified transmission time.

Figure 8:
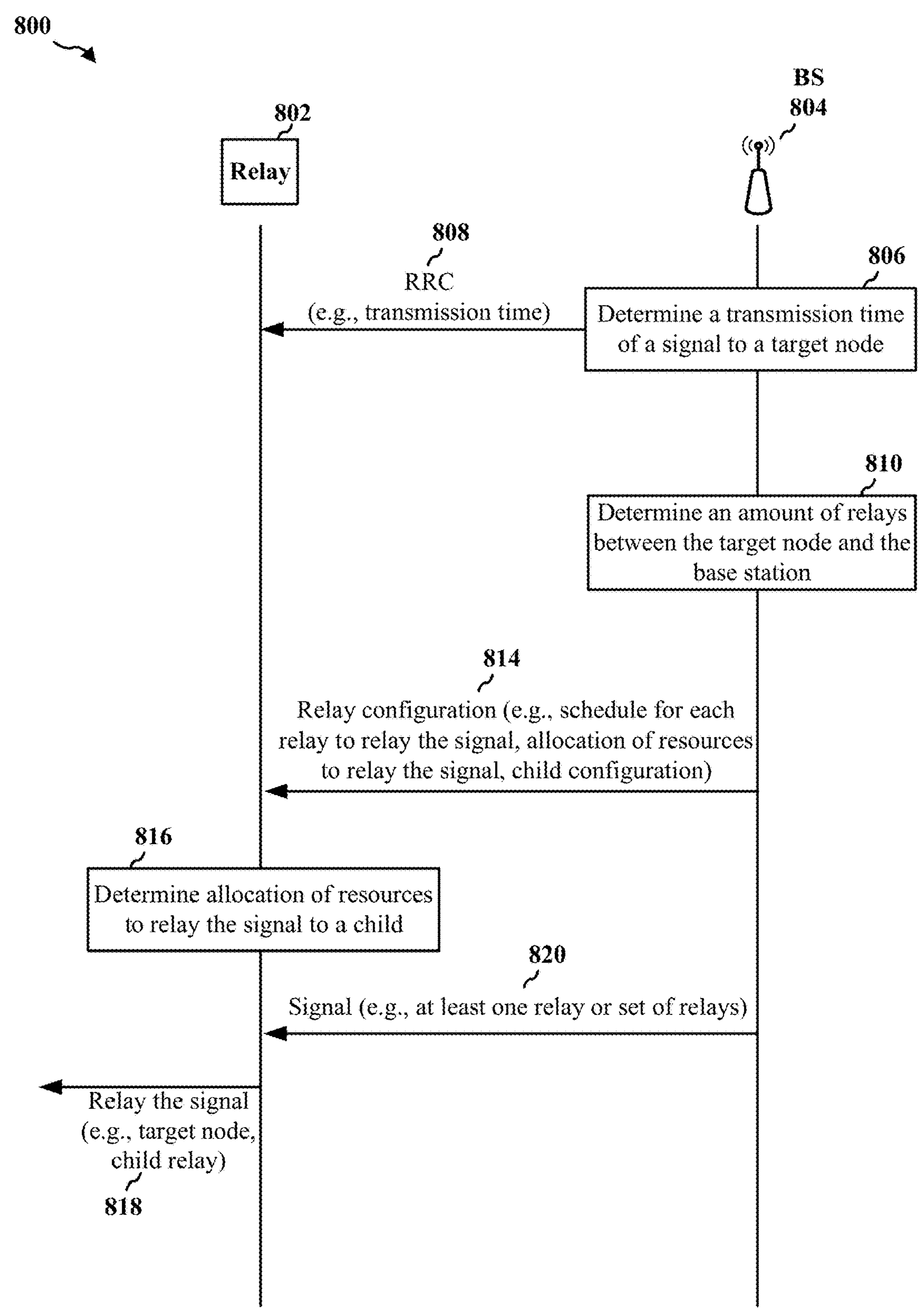
FIG. 8 is a call flow diagram of signaling between a relay device and a base station.

FIG. 8 is a call flow diagram 800 of signaling between a relay device 802 and a base station 804. The base station 804 may be configured to provide at least one cell. The relay device 802 may be configured to relay a signal from the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a relay device 802 may correspond to at least relay device 107. In another example, in the context of FIG. 3, the base station 804 may correspond to base station 310.

As illustrated at 806, the base station 804 may base station may determine a transmission time of a signal to a target node. The base station may determine the transmission time of the signal to reach the target node transmitted from the base station. At least one relay may be between the base station and the target node. The signal may comprise a sequence of a plurality of PDCCHs. The transmission time may include the signal being relayed by the at least one relay between the base station and the target node. The relay may be utilized to assist in the transmission between the base station and the target node. In some aspects, the base station 804 may schedule the relaying of the signal by the at least one relay between the base station and the target node. For example, the base station may schedule a specified transmission time for each relay of the at least one relay between the base station and the target node to relay the signal. In some aspects, the target node may comprise a wireless device (e.g., UE). In some aspects, the base station 804, at 808, may transmit an RRC signal to the relay device 802 comprising the scheduling information to relay the signal. For example, the RRC signal 808 may configure the relay 802 with a forwarding time of the signal based on an incoming time of the signal. The RRC signal 808 may configure the relay 802 to relay the signal at a time with regard to the incoming time of the signal and further based on the target child node that receives the relayed signal from the relay 802. In some instances, the base station 804 may configure a time gap between the reception of the signal and the transmission of the signal for each node. In some instances, each child node (not shown) under the same relay (e.g., relay 802) may have the same time gap. In some instances, the base station 804 may configure the time gap for each child node.

As illustrated at 810, the base station 804 may determine a number of relays between the target node and the base station. The base station may determine the number of relays between the target node and the base station that may carry the signal. The signal may be relayed between the target node and the base station based on the number of relays between the target node and the base station. The base station may determine one or more possible relay paths the signal may take to reach the target node, as well as the number of relays for each relay path. For example, a first relay may be connected to two or more child relays, such that two or more relays paths are present after the first relay. In such instances, the base station may determine the number of relays between the base station and the target node for each relay path.

Figures 6A, 6B:
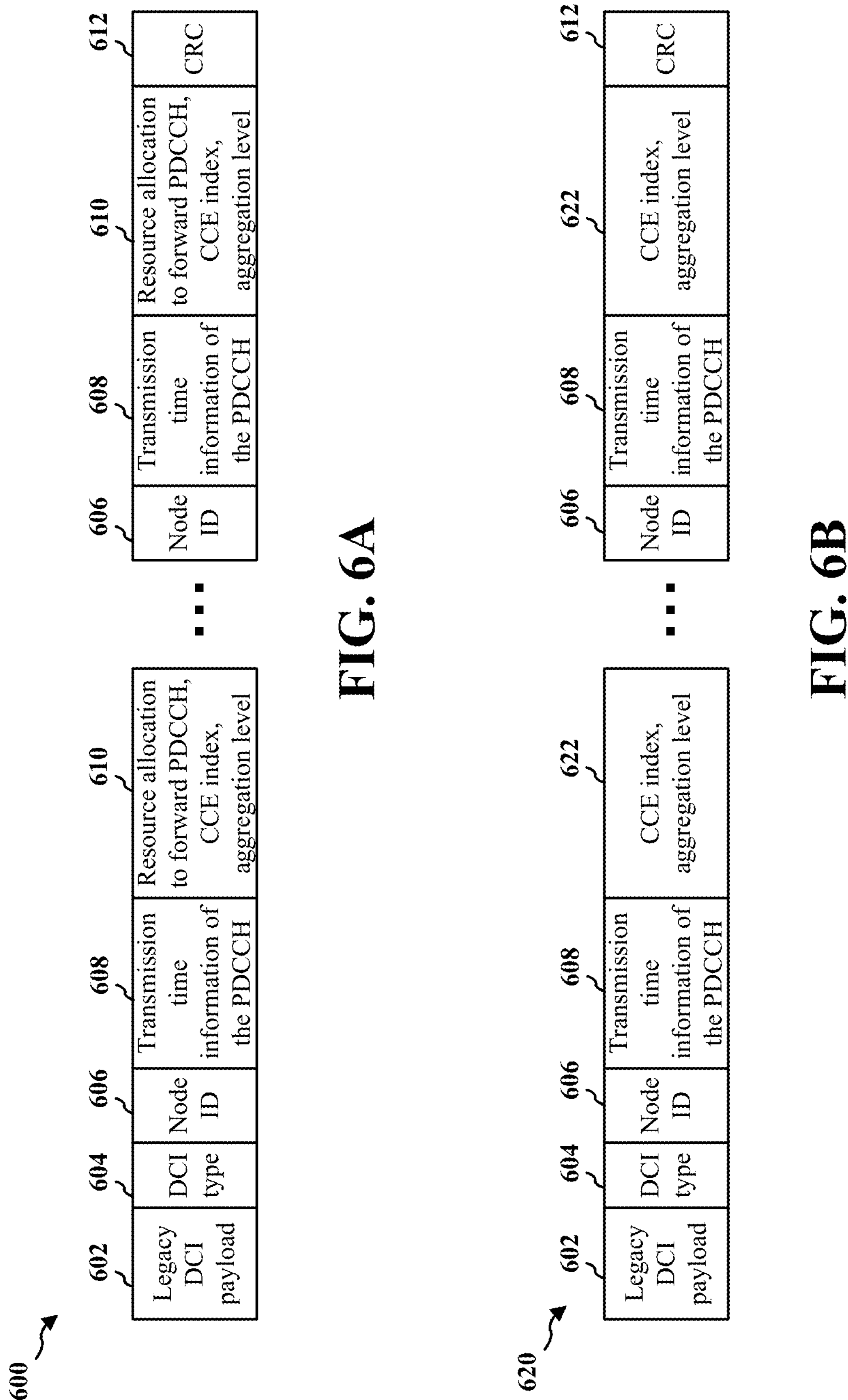
FIG. 6A is a diagram illustrating an example of a signal in a multi-relay based communication.
FIG. 6B is a diagram illustrating an example of a signal in a multi-relay based communication.

The relay configuration may comprise an allocation of resources for each of the at least one relay to relay the signal. In some aspects, the relay configuration may comprise the allocation of resources for each of the at least one relay to relay the signal. The base station may determine the resources to be used in the relaying of the signal for each relay. In some aspects, the allocation of resources for each of the at least one relay to relay the signal may be dynamically scheduled. In some aspects, the signal may comprise a resource allocation for each of the at least one relay to relay the signal. In some aspects, at least one PDCCH of the sequence of PDCCH may comprise the resource allocation, a CORESET ID, a search space ID, a CCE index, an aggregation level, a DCI payload, or a DCI type for each relay. For example, in the context of the example 600 of FIG. 6A, the PDCCH may comprise the legacy DCI payload 602, the DCI type 604, the node ID 606, the transmission time information of the signal (e.g., PDCCH) 608, the resource allocation to forward the signal, CCE index, aggregation level 610, and a CRC 612. The node ID 606 may identify a respective one of the at least one relay node that may forward the signal. Information related to the CORESET ID, a search space ID, a CCE index, an aggregation level, a DCI payload, or a DCI type may be utilized by a last relay that is connected to the target node to construct the signal and relay the reconstructed signal to the target node. In some aspects, the allocation of resources to relay the signal may comprise semi-persistent scheduling resources for the at least one relay. The base station may configure semi-persistent resources for each of the at least one node. Semi-persistent scheduling of resources may allow for a reduction of the payload of the signal. For example, in the context of example 620 of FIG. 6B, field 622 may comprise the CCE index and the aggregation level for each node, without the resource allocation to forward the signal. The removal of the resource allocation to forward the signal (e.g., PDCCH) in the field 622 of FIG. 6B, may reduce the size of the payload of the signal.

Figure 7:
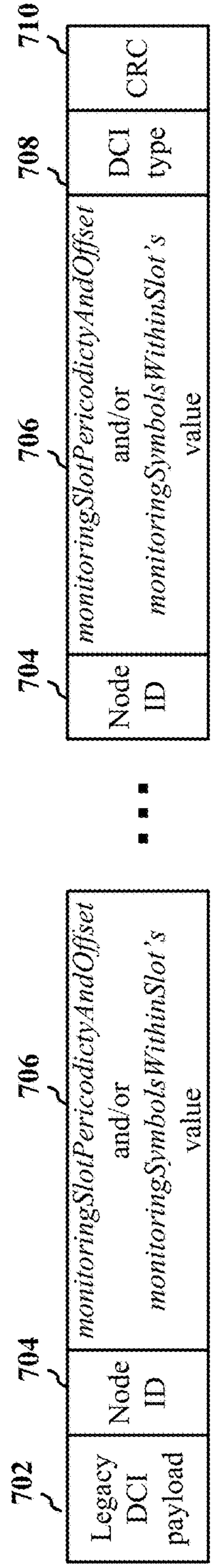
FIG. 7 is a diagram illustrating an example of a signal in a multi-relay based communication.

As illustrated at 814, the base station may transmit a relay configuration comprising scheduling information for each of the at least one relay to relay the signal. The base station may transmit the relay configuration comprising the scheduling information to each of the at least one relay. The relay 802 may receive the relay configuration comprising the schedule from the base station 804. In some aspects, the scheduling information for each of the at least one relay to relay the signal may be based on an incoming time of the signal. In some aspects, the scheduling information for each of the at least one relay may be based on a time gap between reception of the signal and relay of the signal. In some aspects, each relay of the at least one relay may have the same time gap. The scheduling information may define a time gap for each relay of the at least one relay. In some aspects, the relay configuration comprising the scheduling information for each of the at least one relay may be configured via RRC signaling or within a PDCCH. In some aspects, the scheduling information may indicate a transmission time for each of the at least one relay to relay the signal. The signal may comprise a sequence of PDCCHs, and the relay configuration may be transmitted via RRC signaling or within the sequence of PDCCHs. In some aspects, the relay configuration may comprise a child configuration of at least one child node of the at least one relay. The child configuration may indicate available resources to relay the signal to the at least one child node. For example, the relay configuration may indicate the resource (e.g., dynamic grant or configured grant resource) available to relay the signal and the relay 802 may determine the configuration of the CCE and the AL of the relayed signal. The relay 802 may determine the configuration of the CCE and the AL of the relayed signal based on the child configuration from the base station. The child configuration may comprise the configuration for each child node of the relay 802. For example, the child configuration may comprise a different CORESET and a different search space for each child node. In some aspects, the child configuration may comprise the configuration of the CORESET and the search space for all of the connected child nodes, as well as a value of a carrier indicator. In some aspects, the child configuration may be provided to the relay 802 via RRC signaling. In some aspects, the child configuration may comprise a same CORESET for each child node, while having different search spaces for each child node. Using different search spaces may allow for the relayed signal to correspond with a child node based on the relayed signal being within one of the different search spaces. In some aspects, the payload of the signal may be reduced in instances where the same CORESET is used for each child node, such that the child configuration may comprise the configuration of the search space of each child node. In such aspects, to increase the capacity of supported users, some parameters may be set to different values for different nodes. For example, the parameters monitoringSlotPeriodicityAndOffset and/or monitoringSymbolsWithinSlot may be set to be different for different child nodes. The child configuration may further indicate the value of the carrier indicator of the child node(s). In such instances, the base station may preconfigure the value of the carrier indicator for each child node. The value of the carrier indicator may be provided to the relay via RRC signaling or may be within the signal. In the context of the example 700 of FIG. 7, the signal may comprise a legacy DCI payload 702, a node ID 704, and field 706 indicating the value for the parameters monitoringSlotPeriodicityAndOffset and/or monitoringSymbolsWithinSlot. The signal may further comprise a DCI type 708 and a CRC 710.

As illustrated at 816, the relay 802 may determine an allocation of resources to relay the signal to the at least one child node based on the child configuration. The relay 802 may receive the child configuration from the base station 804.

As illustrated at 820, the base station may transmit the signal to at least one relay or a set of relays based on the relay configuration or transmission time. The relay 802 may receive the signal from the base station 820.

As illustrated at 818, the relay 802 may relay the signal based on the scheduling information of the relay configuration. The signal may comprise a sequence of a plurality of PDCCHs. In some instances, the relay device 802 may transmit the signal to at least one relay or a set of relays based on the relay configuration.

Figure 9:
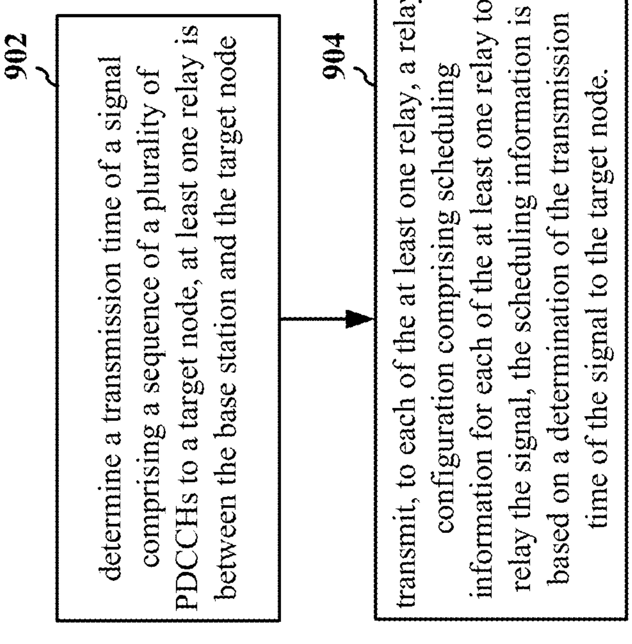
FIG. 9 is a flowchart of a method of wireless communication.

FIG. 9 is a flowchart 900 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to provide an allocation of resources and a relay schedule for multi-relay based communication.

At 902, the base station may determine a transmission time of a signal to a target node. For example, 902 may be performed by determination component 1140 of apparatus 1102. The base station may determine the transmission time of the signal to reach the target node transmitted from the base station. At least one relay may be between the base station and the target node. The signal may comprise a sequence of a plurality of PDCCHs. The transmission time may include the signal being relayed by the at least one relay between the base station and the target node. In some aspects, the target node may comprise a wireless device (e.g., UE). In the context of FIG. 8, the base station 804, at 806, may determine a transmission time of a signal to a target node.

At 904, the base station may transmit a relay configuration comprising scheduling information for each of the at least one relay to relay the signal. For example, 904 may be performed by relay configuration component 1142 of apparatus 1102. The base station may transmit the relay configuration comprising the scheduling information to each of the at least one relay. The scheduling information may be based on a determination of the transmission time of the signal to the target node. In some aspects, the scheduling information for each of the at least one relay to relay the signal may be based on an incoming time of the signal. In some aspects, the scheduling information for each of the at least one relay may be based on a time gap between reception of the signal and relay of the signal. In some aspects, each relay of the at least one relay may have the same time gap. The scheduling information may define a time gap for each relay of the at least one relay. In some aspects, the relay configuration comprising the scheduling information for each of the at least one relay may be configured via RRC signaling or within a PDCCH. In some aspects, the scheduling information may indicate a transmission time for each of the at least one relay to relay the signal. The signal may comprise a sequence of PDCCHs, and the relay configuration may be transmitted via RRC signaling or within the sequence of PDCCHs. In some aspects, the relay configuration may comprise a child configuration of at least one child node of the at least one relay. The child configuration may indicate available resources to relay the signal to the at least one child node. The relay configuration may comprise an allocation of resources for each of the at least one relay to relay the signal. In some aspects, the relay configuration may comprise the allocation of resources for each of the at least one relay to relay the signal. In some aspects, the allocation of resources for each of the at least one relay to relay the signal may be dynamically scheduled. In some aspects, the signal (e.g., PDCCH) may comprise a resource allocation for each of the at least one relay to relay the signal. The signal may comprise a CORESET ID, a search space ID, a CCE index, an aggregation level, a DCI payload, or a DCI type. Information related to the CORESET ID, a search space ID, a CCE index, an aggregation level, a DCI payload, or a DCI type may be utilized by a last relay that is connected to the target node to construct the signal and relay the reconstructed signal to the target node. In some aspects, the allocation of resources to relay the signal may comprise semi-persistent scheduling resources for the at least one relay. In the context of FIG. 8, the base station 804, at 814, may transmit a relay configuration to the at least one relay 802.

Figure 10:
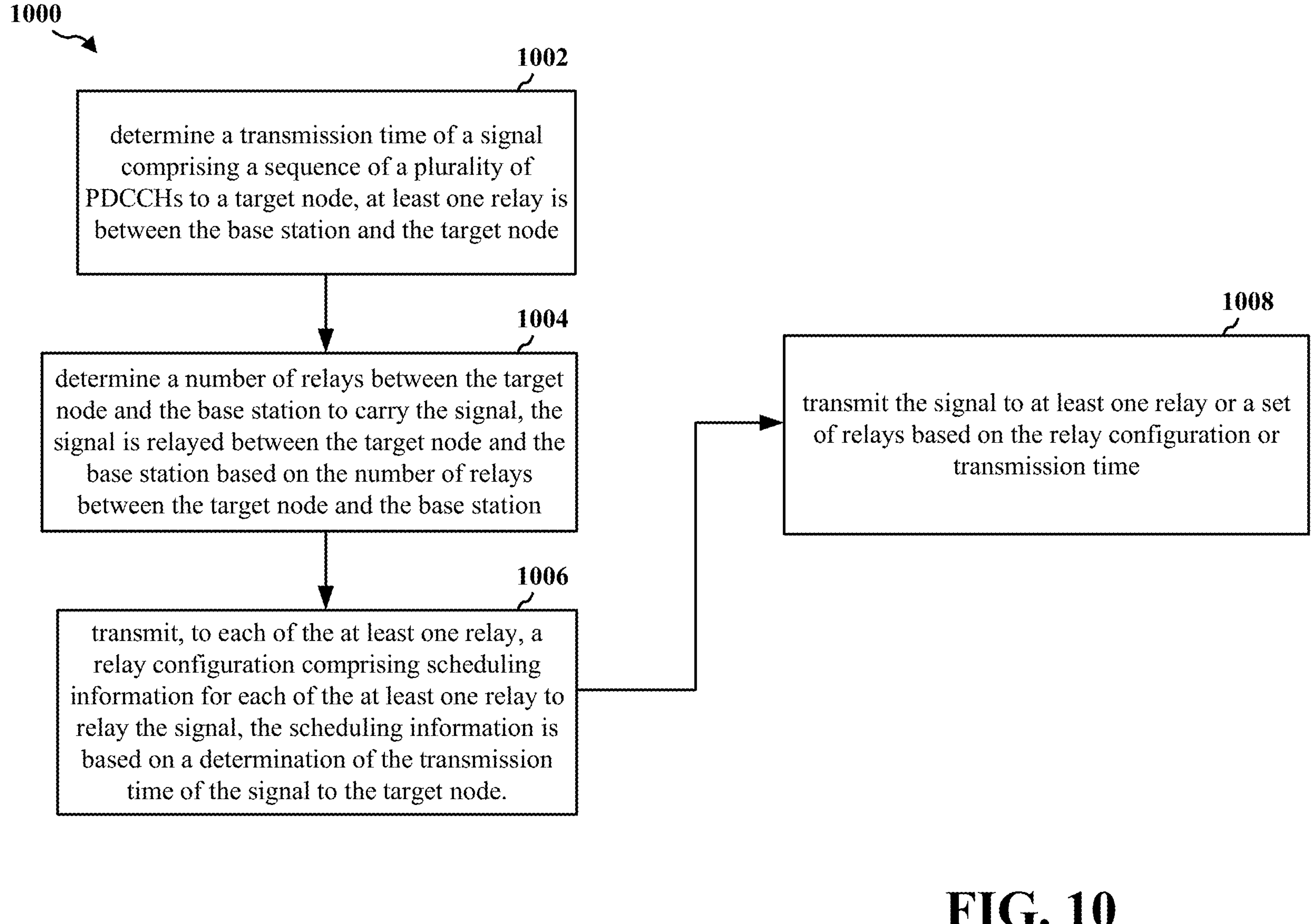
FIG. 10 is a flowchart of a method of wireless communication.

FIG. 10 is a flowchart 1000 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to provide an allocation of resources and a relay schedule for multi-relay based communication.

At 1002, the base station may determine a transmission time of a signal to a target node. For example, 1002 may be performed by determination component 1140 of apparatus 1102. The base station may determine the transmission time of the signal to reach the target node transmitted from the base station. At least one relay may be between the base station and the target node. The signal may comprise a sequence of a plurality of PDCCHs. The transmission time may include the signal being relayed by the at least one relay between the base station and the target node. In some aspects, the target node may comprise a wireless device (e.g., UE). In the context of FIG. 8, the base station 804, at 806, may determine a transmission time of a signal to a target node.

At 1004, the base station may determine a number of relays between the target node and the base station. For example, 1004 may be performed by determination component 1140 of apparatus 1102. The base station may determine the number of relays between the target node and the base station that may carry the signal. The signal may be relayed between the target node and the base station based on the number of relays between the target node and the base station. The base station may determine one or more possible relay paths the signal may take to reach the target node, as well as the number of relays for each relay path. For example, a first relay may be connected to two or more child relays, such that two or more relays paths are present after the first relay. In such instances, the base station may determine the number of relays between the base station and the target node for each relay path. In the context of FIG. 8, the base station 804, at 810, may determine a number of relays between the target node (not shown) and the base station 804.

At 1006, the base station may transmit a relay configuration comprising scheduling information for each of the at least one relay to relay the signal. For example, 1006 may be performed by relay configuration component 1142 of apparatus 1102. The base station may transmit the relay configuration comprising the scheduling information to each of the at least one relay. The scheduling information may be based on a determination of the transmission time of the signal to the target node. In some aspects, the scheduling information for each of the at least one relay to relay the signal may be based on an incoming time of the signal. In some aspects, the scheduling information for each of the at least one relay may be based on a time gap between reception of the signal and relay of the signal. In some aspects, each relay of the at least one relay may have the same time gap. The scheduling information may define a time gap for each relay of the at least one relay. In some aspects, the relay configuration comprising the scheduling information for each of the at least one relay may be configured via RRC signaling or within a PDCCH. In some aspects, the scheduling information may indicate a transmission time for each of the at least one relay to relay the signal. The signal may comprise a sequence of PDCCHs, and the relay configuration may be transmitted via RRC signaling or within the sequence of PDCCHs. In some aspects, the relay configuration may comprise a child configuration of at least one child node of the at least one relay. The child configuration may indicate available resources to relay the signal to the at least one child node. The relay configuration may comprise an allocation of resources for each of the at least one relay to relay the signal. In some aspects, the relay configuration may comprise the allocation of resources for each of the at least one relay to relay the signal. In some aspects, the allocation of resources for each of the at least one relay to relay the signal may be dynamically scheduled. In some aspects, the signal (e.g., PDCCH) may comprise a resource allocation for each of the at least one relay to relay the signal. The signal may comprise a CORESET ID, a search space ID, a CCE index, an aggregation level, a DCI payload, or a DCI type. Information related to the CORESET ID, a search space ID, a CCE index, an aggregation level, a DCI payload, or a DCI type may be utilized by a last relay that is connected to the target node to construct the signal and relay the reconstructed signal to the target node. In some aspects, the allocation of resources to relay the signal may comprise semi-persistent scheduling resources for the at least one relay. In the context of FIG. 8, the base station 804, at 814, may transmit a relay configuration to the at least one relay 802.

Figure 11:
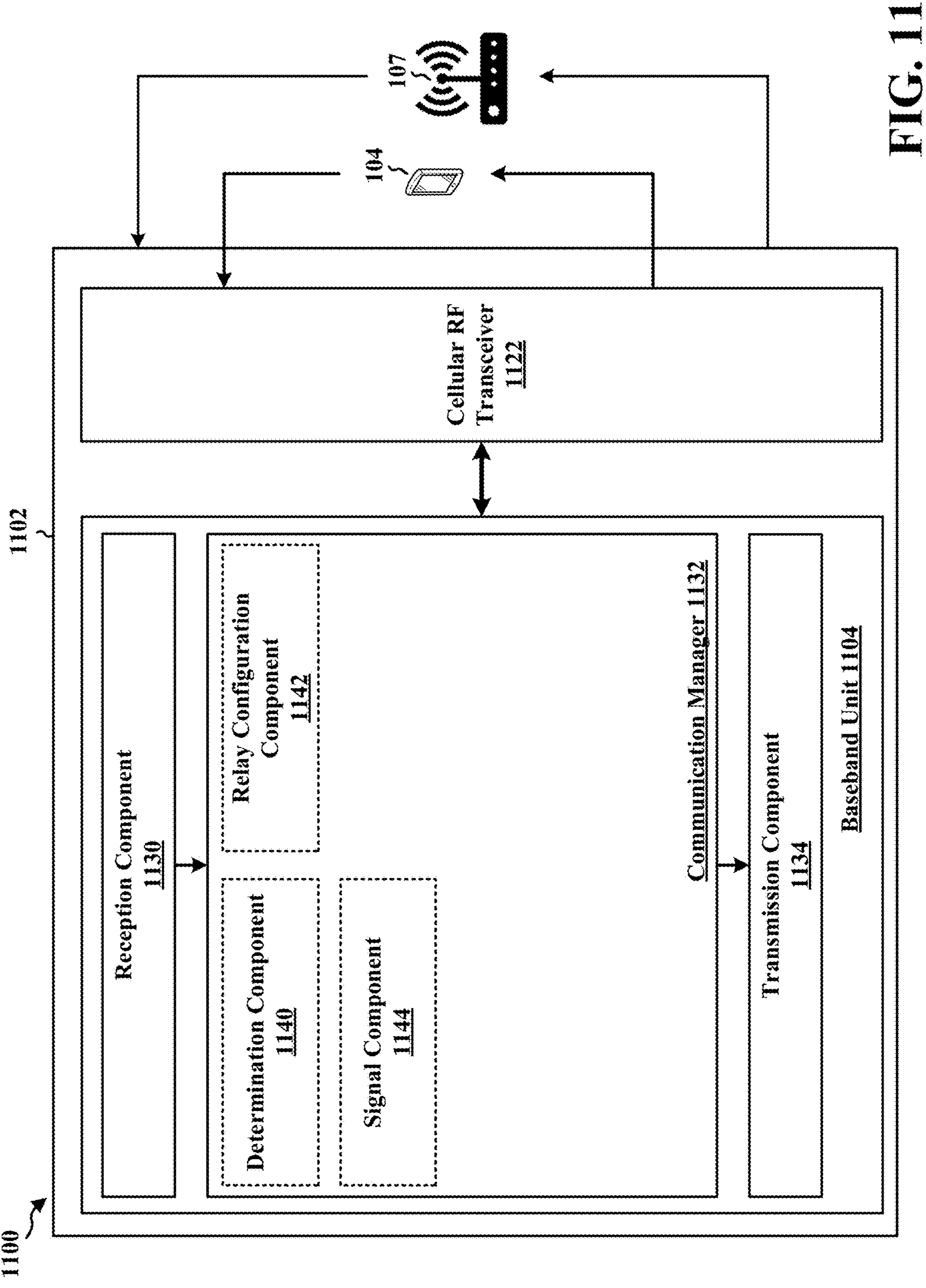
FIG. 11 is a diagram illustrating an example of a hardware implementation for an example apparatus.

At 1008, the base station may transmit the signal to at least one relay based on the relay configuration or transmission time. For example, 1008 may be performed by signal component 1144 of apparatus 1102. The base station may transmit the signal to at least one relay or a set of relays based on the relay configuration or transmission time. In the context of FIG. 8, the base station 804, at 820, may transmit the signal to at least one relay FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104 and/or the relay device 107. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a determination component 1140 that may determine a transmission time of a signal to a target node, e.g., as described in connection with 902 of FIG. 9 or 1002 of FIG. 10. The determination component may be configured to determine a number of relays between the target node and the base station, e.g., as described in connection with 1004 of FIG. 10. The communication manager 1132 further includes a relay configuration component 1142 that may transmit a relay configuration comprising scheduling information for each of the at least one relay to relay the signal, e.g., as described in connection with 904 of FIG. 9 or 1006 of FIG. 10. The communication manager 1132 further includes a signal component 1144 that may transmit the signal to at least one relay based on the relay configuration or transmission time, e.g., as described in connection with 1008 of FIG. 10.

The apparatus may include additional components that perform each of the blocks of the algorithm in the flowcharts of FIG. 9 or 10. As such, each block in the flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for determining a transmission time of a signal comprising a sequence of a plurality of PDCCHs to a target node. At least one relay is between the base station and the target node. The apparatus includes means for transmitting, to each of the at least one relay, a relay configuration comprising scheduling information for each of the at least one relay to relay the signal. The scheduling information is based on a determination of the transmission time of the signal to the target node. The apparatus further includes means for determining a number of relays between the target node and the base station to carry the signal. The signal is relayed between the target node and the base station based on the number of relays between the target node and the base station. The apparatus further includes means for transmitting the signal to at least one relay or a set of relays based on the relay configuration or transmission time. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
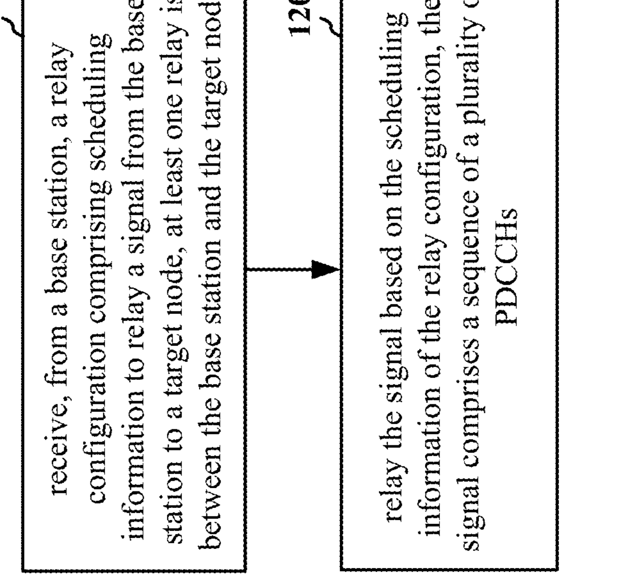
FIG. 12 is a flowchart of a method of wireless communication.
Figure 12:
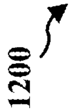

FIG. 12 is a flowchart 1200 of a method of wireless communication. The method may be performed by a relay device or a component of a relay device (e.g., the relay device 107; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a relay device to relay a signal based on an allocation of resources and a relay schedule for multi-relay based communication received from a base station.

At 1202, the relay device may receive a relay configuration comprising scheduling information to relay a signal from a base station to a target node. For example, 1202 may be performed by relay configuration component 1440 of apparatus 1402. The relay device may receive the relay configuration from the base station. At least one relay may be between the base station and the target node. In some aspects, the scheduling information for each of the at least one relay may be based on an incoming time of the signal. In some aspects, the scheduling information for each of the at least one relay may be based on a time gap between reception of the signal and relay of the signal. Each of the at least one relay may have a same time gap. The scheduling information may define a time gap for each of the at least one relay. In some aspects, the relay configuration comprising the scheduling information for each of the at least one relay may be configured via RRC or within a PDCCH. In some aspects, the scheduling information may indicate a transmission time for each of the at least one relay to relay the signal. In some aspects, the signal may comprise a sequence of PDCCHs. The relay configuration may comprise an allocation of resources to relay the signal. In some aspects, the relay configuration may indicate the allocation of resources for each of the at least one relay to relay the signal, the signal further comprising a CORESET ID, a search space ID, a CCE index, an aggregation level, a DCI payload, or a DCI type. In some aspects, the relay configuration may comprise dynamically scheduled resources for each of the at least one relay to relay the signal. In some aspects, the relay configuration may comprise semi-persistent resources for at least one relay to relay the signal. The indication of the allocation of resources to relay the signal may be comprised within the relay configuration. In the context of FIG. 8, the relay 802, at 814, may receive a relay configuration from the base station 804.

At 1204, the relay device may relay the signal. For example, 1204 may be performed by relay component 1446 of apparatus 1402. The relay device may relay the signal based on the scheduling information of the relay configuration. The signal may comprise a sequence of a plurality of PDCCHs. In the context of FIG. 8, the relay 802, at 818, may relay the signal based on the scheduling information of the relay configuration.

Figure 13:
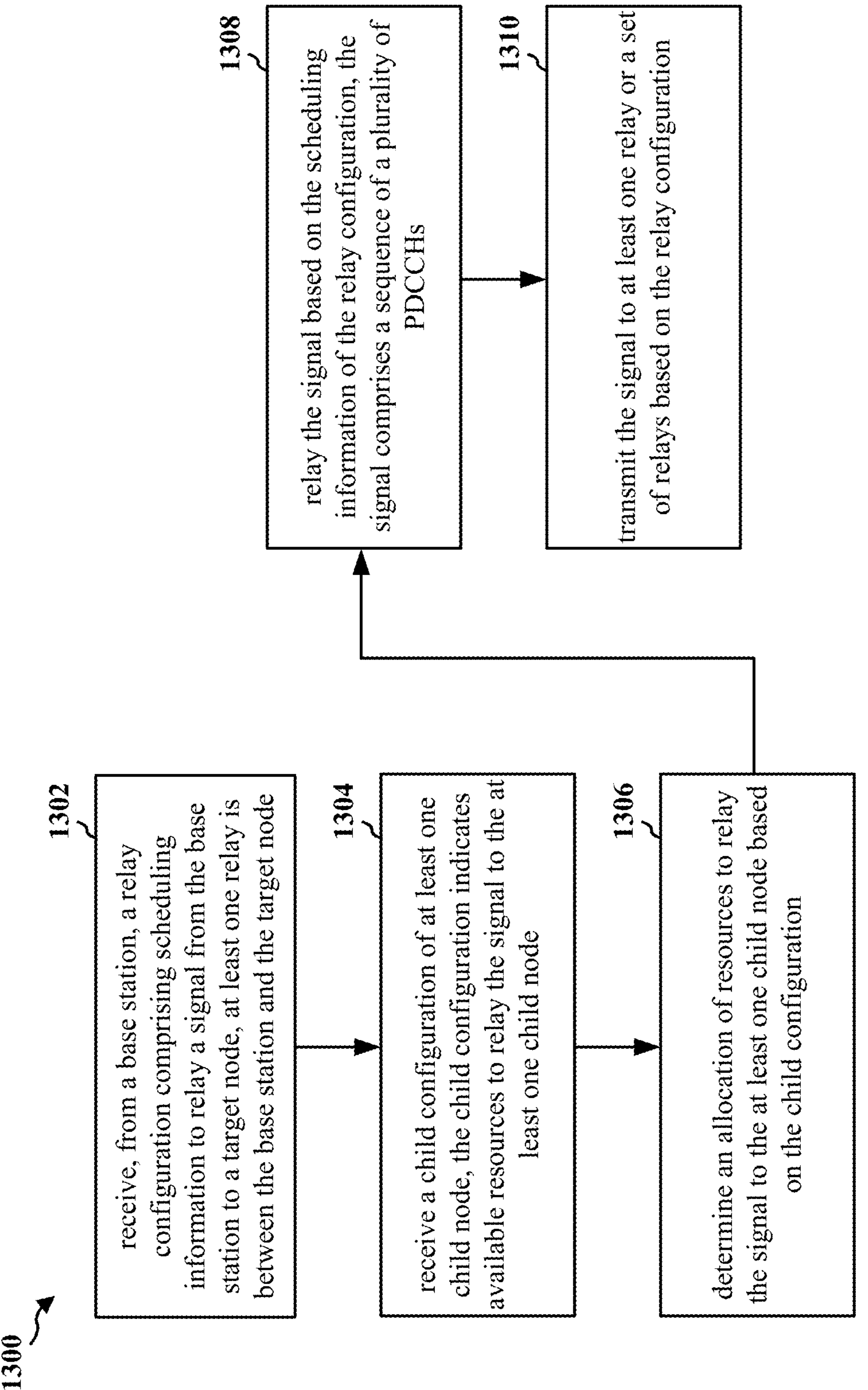
FIG. 13 is a flowchart of a method of wireless communication.

FIG. 13 is a flowchart 1300 of a method of wireless communication. The method may be performed by a relay device or a component of a relay device (e.g., the relay device 107; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to relay a signal based on an allocation of resources and a relay schedule for multi-relay based communication received from a base station.

At 1302, the relay device may receive a relay configuration comprising scheduling information to relay a signal from a base station to a target node. For example, 1302 may be performed by relay configuration component 1440 of apparatus 1402. The relay device may receive the relay configuration from the base station. At least one relay may be between the base station and the target node. In some aspects, the scheduling information for each of the at least one relay may be based on an incoming time of the signal. In some aspects, the scheduling information for each of the at least one relay may be based on a time gap between reception of the signal and relay of the signal. Each of the at least one relay may have a same time gap. The scheduling information may define a time gap for each of the at least one relay. In some aspects, the relay configuration comprising the scheduling information for each of the at least one relay may be configured via RRC or within a PDCCH. In some aspects, the scheduling information may indicate a transmission time for each of the at least one relay to relay the signal. In some aspects, the signal may comprise a sequence of PDCCHs. The relay configuration may comprise an allocation of resources to relay the signal. In some aspects, the relay configuration may indicate the allocation of resources for each of the at least one relay to relay the signal, the signal further comprising a CORESET ID, a search space ID, a CCE index, an aggregation level, a DCI payload, or a DCI type. In some aspects, the relay configuration may comprise dynamically scheduled resources for each of the at least one relay to relay the signal. In some aspects, the relay configuration may comprise semi-persistent resources for at least one relay to relay the signal. The indication of the allocation of resources to relay the signal may be comprised within the relay configuration. In the context of FIG. 8, the relay 802, at 814, may receive a relay configuration from the base station 804.

At 1304, the relay device may receive a child configuration of at least one child node. For example, 1304 may be performed by child configuration component 1442 of apparatus 1402. The child configuration may indicate available resources to relay the signal to the at least one child node. The child configuration may indicate all of the child nodes that fall under the relay node. In the context of FIG. 8, the relay 802, at 814, may receive a child configuration of at least one child node. The child configuration may be comprised within the relay configuration.

At 1306, the relay device may determine an allocation of resources to relay the signal. For example, 1306 may be performed allocation component 1444 of apparatus 1402. The relay device may determine the allocation of resources to relay the signal to the at least one child node based on the child configuration. In the context of FIG. 8, the relay 802, at 816, may determine an allocation of resources to relay the signal.

At 1308, the relay device may relay the signal. For example, 1308 may be performed by signal component 1446 of apparatus 1402. The relay device may relay the signal based on the scheduling information of the relay configuration. The signal may comprise a sequence of a plurality of PDCCHs. In the context of FIG. 8, the relay 802, at 818, may relay the signal based on the scheduling information of the relay configuration.

At 1310, the relay device may transmit the signal to at least one relay based on the relay configuration. For example, 1310 may be performed by signal component 1446 of apparatus 1402. The relay device may transmit the signal to at least one relay or a set of relays based on the relay configuration.

Figure 14:
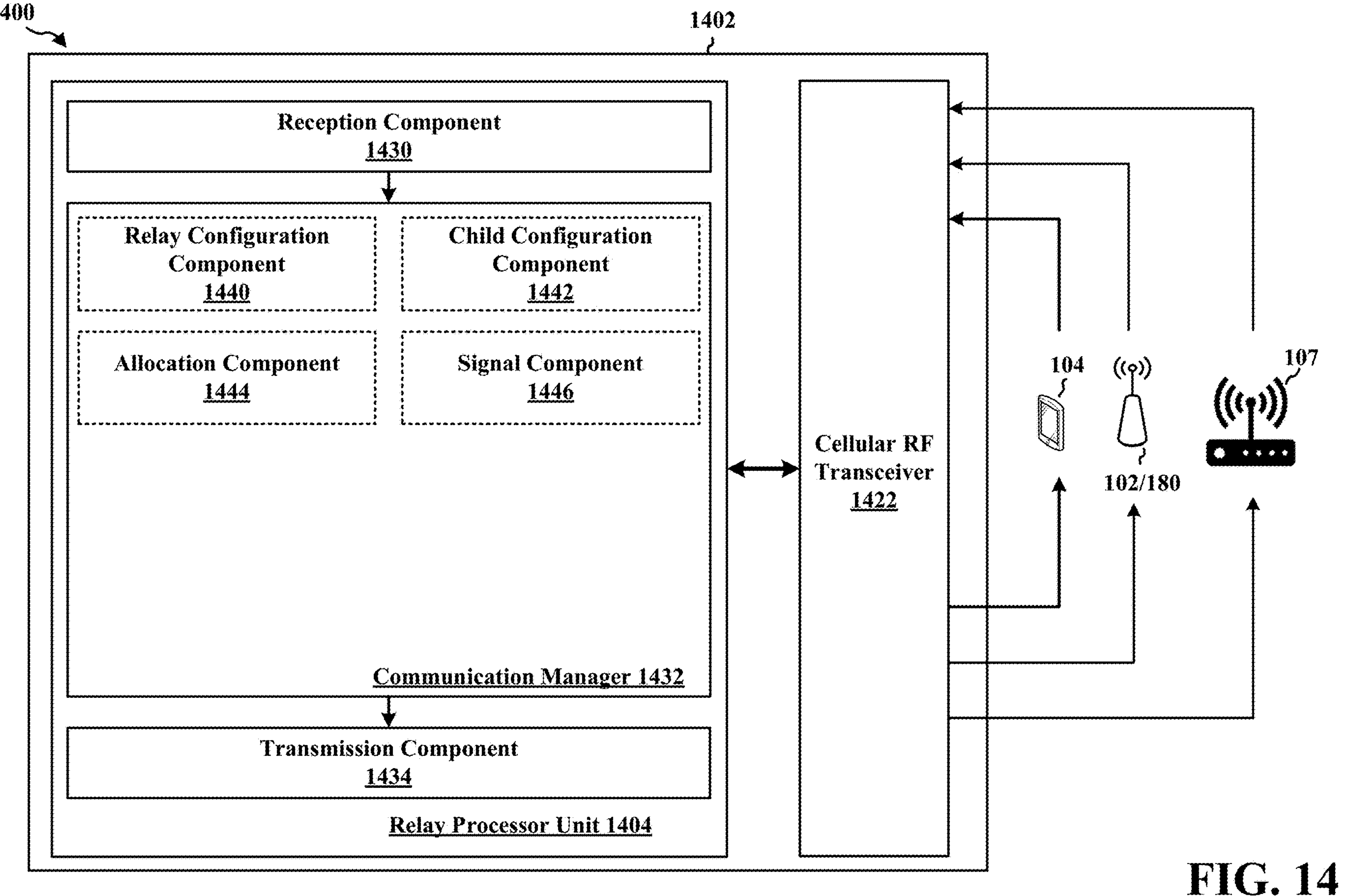
FIG. 14 is a diagram illustrating an example of a hardware implementation for an example apparatus.

FIG. 14 is a diagram 1400 illustrating an example of a hardware implementation for an apparatus 1402. The apparatus 1402 may be a relay device and may include a relay processor unit 1404. The relay processor unit 1404 may communicate through a cellular RF transceiver 1422 with the UE 104, a base station 102/180, and/or a relay device 107. The relay processor unit 1404 may include a computer-readable medium/memory. The relay processor unit 1404 is responsible for general processing, including the execution of software stored on the computer-readable medium/memory. The software, when executed by the relay processor unit 1404, causes the relay processor unit 1404 to perform the various functions described supra. The computer-readable medium/memory may also be used for storing data that is manipulated by the relay processor unit 1404 when executing software. The relay processor unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the relay processor unit 1404. The relay processor unit 1404 may be a component of the relay device 107 and may include the memory 376 and/or at least one of the TX processor 316, the RX processor 370, and the controller/processor 375, such as described in connection with the device 310.

The communication manager 1432 includes a relay configuration component 1440 that may receive a relay configuration comprising scheduling information to relay a signal from a base station to a target node, e.g., as described in connection with 1202 of FIG. 12 or 1302 of FIG. 13. The communication manager 1432 further includes a child configuration component 1442 that may receive a child configuration of at least one child node, e.g., as described in connection with 1304 of FIG. 13. The communication manager 1432 further includes an allocation component 1444 that may determine an allocation of resources to relay the signal, e.g., as described in connection with 1306 of FIG. 13. The communication manager 1432 further includes a signal component 1446 that may relay the signal, e.g., as described in connection with 1204 of FIG. 12 or 1308 of FIG. 13. The signal component 1446 may be configured to transmit the signal to at least one relay based on the relay configuration, e.g., as described in connection with 1310 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving, from a base station, a relay configuration comprising scheduling information to relay a signal from the base station to a target node. At least one relay is between the base station and the target node. The apparatus includes means for relaying the signal based on the scheduling information of the relay configuration. The signal comprises a sequence of a plurality of PDCCHs. The apparatus further includes means for receiving a child configuration of at least one child node. The child configuration indicates available resources to relay the signal to the at least one child node. The apparatus further includes means for determining an allocation of resources to relay the signal to the at least one child node based on the child configuration. The apparatus further includes means for transmitting the signal to at least one relay or a set of relays based on the relay configuration. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and a transceiver configured to determine a transmission time of a signal comprising a sequence of a plurality of PDCCHs to a target node, wherein at least one relay is between the base station and the target node; and transmit, to each of the at least one relay, a relay configuration comprising scheduling information for each of the at least one relay to relay the signal, wherein the scheduling information is based on a determination of the transmission time of the signal to the target node.

Aspect 2 is the apparatus of aspect 1, further including that the scheduling information for each of the at least one relay is based on an incoming time of the signal.

Aspect 3 is the apparatus of any of aspects 1 and 2, further including that the scheduling information for each of the at least one relay is based on a time gap between reception of the signal and relay of the signal.

Aspect 4 is the apparatus of any of aspects 1-3, further including that each of the at least one relay has a same time gap.

Aspect 5 is the apparatus of any of aspects 1-4, further including that the scheduling information defines a time gap for each of the at least one relay.

Aspect 6 is the apparatus of any of aspects 1-5, further including that the relay configuration comprises the scheduling information for each of the at least one relay is configured via RRC signaling or within a PDCCH.

Aspect 7 is the apparatus of any of aspects 1-6, further including that the scheduling information indicates a transmission time for each of the at least one relay to relay the signal.

Aspect 8 is the apparatus of any of aspects 1-7, further configured to determine a number of relays between the target node and the base station to carry the signal, wherein the signal is relayed between the target node and the base station based on the number of relays between the target node and the base station.

Aspect 9 is the apparatus of any of aspects 1-8, further including that the signal comprises a sequence of PDCCHs, wherein the relay configuration is transmitted via RRC signaling.

Aspect 10 is the apparatus of any of aspects 1-9, further including that the relay configuration comprises an allocation of resources for each of the at least one relay to relay the signal, wherein the relay configuration comprises the allocation of resources for each of the at least one relay to relay the signal.

Aspect 11 is the apparatus of any of aspects 1-10, further including that the allocation of resources for each of the at least one relay to relay the signal is dynamically scheduled.

Aspect 12 is the apparatus of any of aspects 1-11, further including that the signal comprises a resource allocation for each of the at least one relay to relay the signal, the signal further comprising a CORESET ID, a search space ID, a CCE index, an aggregation level, a DCI payload, or a DCI type.

Aspect 13 is the apparatus of any of aspects 1-12, further including that the resources to relay the signal comprise semi-persistent resources for the at least one relay.

Aspect 14 is the apparatus of any of aspects 1-13, further including that the relay configuration comprises a child configuration of at least one child node of the at least one relay, wherein the child configuration indicates available resources to relay the signal to the at least one child node.

Aspect 15 is the apparatus of any of aspects 1-14, further configured to transmit the signal to at least one relay or a set of relays based on the relay configuration or transmission time.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, where the code when executed by a processor causes the processor to implement any of aspects 1-15.

Aspect 19 is an apparatus for wireless communication at a relay device including at least one processor coupled to a memory and a transceiver configured to receive, from a base station, a relay configuration comprising scheduling information to relay a signal from the base station to a target node, wherein at least one relay is between the base station and the target node; and relay the signal based on the scheduling information of the relay configuration, wherein the signal comprises a sequence of a plurality of PDCCHs.

Aspect 20 is the apparatus of aspect 19, further including that the scheduling information for each of the at least one relay to relay the signal is based on an incoming time of the signal.

Aspect 21 is the apparatus of any of aspects 19 and 20, further including that the scheduling information for each of the at least one relay to relay the signal is based on a time gap between reception of the signal and relay of the signal.

Aspect 22 is the apparatus of any of aspects 19-21, further including that each of the at least one relay has a same time gap.

Aspect 23 is the apparatus of any of aspects 19-22, further including that the scheduling information defines a time gap for each of the at least one relay.

Aspect 24 is the apparatus of any of aspects 19-23, further including that the relay configuration comprising the scheduling information for each of the at least one relay is configured via RRC signaling or within a PDCCH.

Aspect 25 is the apparatus of any of aspects 19-24, further including that the scheduling information indicates a transmission time for each of the at least one relay to relay the signal.

Aspect 26 is the apparatus of any of aspects 19-25, further including that the signal comprises a sequence of PDCCHs.

Aspect 27 is the apparatus of any of aspects 19-26, further including that the relay configuration comprises an allocation of resources to relay the signal.

Aspect 28 is the apparatus of any of aspects 19-27, further including that the relay configuration indicates the allocation of resources for each of the at least one relay to relay the signal, the signal further comprising a CORESET ID, a search space ID, a CCE index, an aggregation level, a DCI payload, or a DCI type.

Aspect 29 is the apparatus of any of aspects 19-28, further including that the relay configuration comprises dynamically scheduled resources for each of the at least one relay to relay the signal or semi-persistent resources for at least one relay to relay the signal.

Aspect 30 is the apparatus of any of aspects 19-29, further configured to receive a child configuration of at least one child node, wherein the child configuration indicates available resources to relay the signal to the at least one child node; and determine an allocation of resources to relay the signal to the at least one child node based on the child configuration.

Aspect 31 is the apparatus of any of aspects 19-30, further configured to transmit the signal to at least one relay or a set of relays based on the relay configuration.

Aspect 32 is a method of wireless communication for implementing any of aspects 19-31.

Aspect 33 is an apparatus for wireless communication including means for implementing any of aspects 19-31.

Aspect 34 is a computer-readable medium storing computer executable code, where the code when executed by a processor causes the processor to implement any of aspects 19-31.

What is claimed is:

1. An apparatus for wireless communication at a base station, comprising:
 a memory;
 a transceiver; and
 at least one processor coupled to the memory and the transceiver, the at least one processor configured to:
  determine a transmission time of a signal comprising a sequence of a plurality of physical downlink control channels (PDCCHs) to a target node, wherein at least one relay is between the base station and the target node; and
  transmit, to each of the at least one relay, a relay configuration comprising scheduling information for each of the at least one relay to relay the signal, wherein the scheduling information is based on a determination of the transmission time of the signal to the target node.

2. The apparatus of claim 1, wherein the scheduling information for each of the at least one relay is based on an incoming time of the signal.

3. The apparatus of claim 1, wherein the scheduling information for each of the at least one relay is based on a time gap between reception of the signal and relay of the signal.

4. The apparatus of claim 3, wherein each of the at least one relay has a same time gap.

5. The apparatus of claim 3, wherein the scheduling information defines a time gap for each of the at least one relay.

6. The apparatus of claim 1, wherein the relay configuration comprises the scheduling information for each of the at least one relay is configured via RRC signaling or within a PDCCH.

7. The apparatus of claim 1, wherein the scheduling information indicates a transmission time for each of the at least one relay to relay the signal.

8. The apparatus of claim 1, wherein the at least one processor is further configured to:
 determine a number of relays between the target node and the base station to carry the signal, wherein the signal is relayed between the target node and the base station based on the number of relays between the target node and the base station.

9. The apparatus of claim 1, wherein the signal comprises a sequence of physical downlink control channels (PDCCHs), wherein the relay configuration is transmitted via radio resource control (RRC) signaling.

10. The apparatus of claim 1, wherein the relay configuration comprises an allocation of resources for each of the at least one relay to relay the signal, wherein the relay configuration comprises the allocation of resources for each of the at least one relay to relay the signal.

11. The apparatus of claim 10, wherein the allocation of resources for each of the at least one relay to relay the signal is dynamically scheduled.

12. The apparatus of claim 11, wherein the signal comprises a resource allocation for each of the at least one relay to relay the signal, the signal further comprising a control resource set (CORESET) identifier (ID), a search space ID, a control channel element (CCE) index, an aggregation level, a downlink control information (DCI) payload, or a DCI type.

13. The apparatus of claim 10, wherein the resources to relay the signal comprise semi-persistent resources for the at least one relay.

14. The apparatus of claim 10, wherein the relay configuration comprises a child configuration of at least one child node of the at least one relay, wherein the child configuration indicates available resources to relay the signal to the at least one child node.

15. The apparatus of claim 1, wherein the at least one processor is further configured to:
 transmit the signal to at least one relay or a set of relays based on the relay configuration or transmission time.

16. A method of wireless communication at a base station, comprising:
 determining a transmission time of a signal to a target node, wherein at least one relay is between the base station and the target node; and
 transmitting, to the at least one relay, a relay configuration comprising scheduling information for each of the at least one relay to relay the signal, wherein the scheduling information is based on the transmission time of the signal to the target node.

17. An apparatus for wireless communication at a relay device, comprising:
 a memory;
 a transceiver; and
 at least one processor coupled to the memory and the transceiver, the at least one processor configured to:
  receive, from a base station, a relay configuration comprising scheduling information to relay a signal from the base station to a target node, wherein at least one relay is between the base station and the target node; and
  relay the signal based on the scheduling information of the relay configuration, wherein the signal comprises a sequence of a plurality of physical downlink control channels (PDCCHs).

18. The apparatus of claim 17, wherein the scheduling information for each of the at least one relay is based on an incoming time of the signal.

19. The apparatus of claim 17, wherein the scheduling information for each of the at least one relay is based on a time gap between reception of the signal and relay of the signal.

20. The apparatus of claim 19, wherein each of the at least one relay has a same time gap.

21. The apparatus of claim 19, wherein the scheduling information defines a time gap for each of the at least one relay.

22. The apparatus of claim 17, wherein the relay configuration comprising the scheduling information for each of the at least one relay is configured via RRC signaling or within a PDCCH.

23. The apparatus of claim 17, wherein the scheduling information indicates a transmission time for each of the at least one relay to relay the signal.

24. The apparatus of claim 17, wherein the signal comprises a sequence of physical downlink control channels (PDCCHs).

25. The apparatus of claim 17, wherein the relay configuration comprises an allocation of resources to relay the signal.

26. The apparatus of claim 25, wherein the relay configuration indicates the allocation of resources for each of the at least one relay to relay the signal, the signal further comprising a control resource set (CORESET) identifier (ID), a search space ID, a control channel element (CCE) index, an aggregation level, a downlink control information (DCI) payload, or a DCI type.

27. The apparatus of claim 25, wherein the relay configuration comprises dynamically scheduled resources for each of the at least one relay to relay the signal or semi-persistent resources for at least one relay to relay the signal.

28. The apparatus of claim 17, wherein the at least one processor is further configured to:

receive a child configuration of at least one child node, wherein the child configuration indicates available resources to relay the signal to the at least one child node; and determine an allocation of resources to relay the signal to the at least one child node based on the child configuration.

29. The apparatus of claim 17, wherein the at least one processor is further configured to:

transmit the signal to at least one relay or a set of relays based on the relay configuration.

30. A method of wireless communication at a relay device, comprising:

receiving, from a base station, a relay configuration comprising scheduling information to relay a signal from the base station to a target node, wherein at least one relay is between the base station and the target node; and relaying the signal based on the scheduling information of the relay configuration, wherein the signal comprises a sequence of a plurality of physical downlink control channels (PDCCHs).

* * * * *